Figure 1:
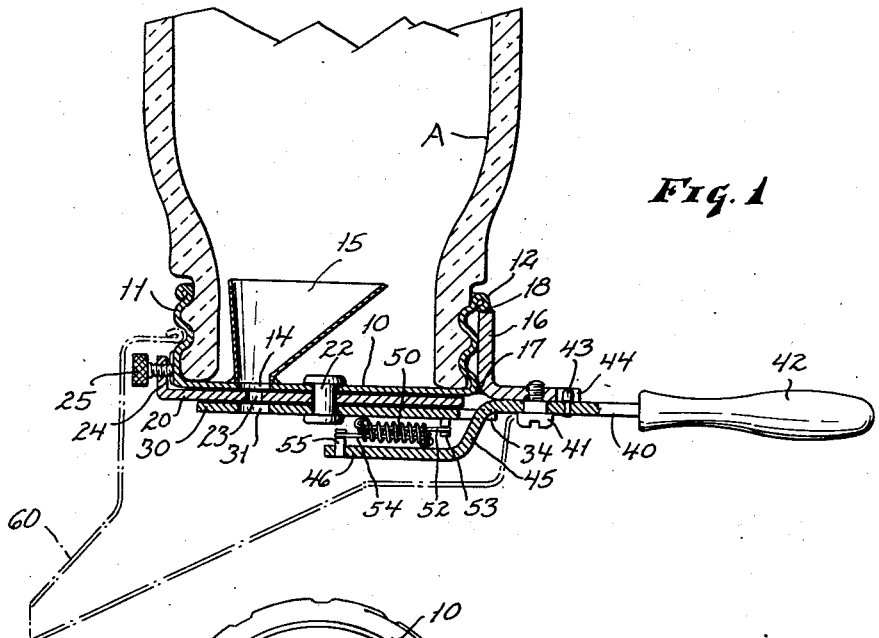

Nov. 7, 1944.  J. V. LUDWIG  2,362,387
SEED PLANTER
Filed May 30, 1942

INVENTOR.
BY Joseph V. Ludwig,
Bates, Teare & McKee
Attorneys

Patented Nov. 7, 1944

2,362,387

UNITED STATES PATENT OFFICE 2,362,387

SEED PLANTER

Joseph V. Ludwig, Cleveland, Ohio

Application May 30, 1942, Serial No. 445,218

14 Claims. (Cl. 222—498)

This invention relates to a seed planter of the type adapted to be carried in the operator's hands and manipulated to discharge seeds. The object of the invention is to provide such a device in a very simple form which may be readily operable and shall be efficient to discharge the seeds one after another.

My device may be readily set for seeds of different sizes. The discharge is effected by the oscillation of a lever by one hand of the operator, while with the other he carries a seed container with the discharging mechanism attached thereto. My discharging mechanism is preferably formed so that it may be mounted on an ordinary glass jar, like a Mason jar, for instance, in place of the usual screw cap.

My invention will be more apparent from the following description of a preferred embodiment, illustrated in the drawing.

Figure 2:
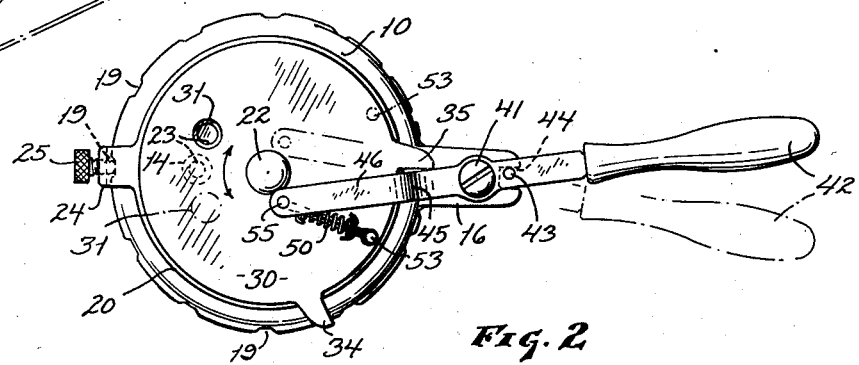
Figure 3:
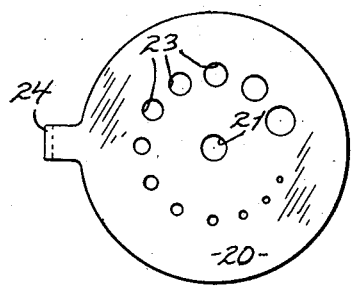
Figure 4:
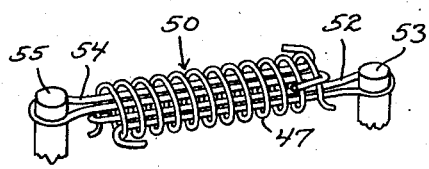

In the drawing, Fig. 1 is a vertical central section through my seed planter, showing the mechanism in place on an inverted bottle or jar; Fig. 2 is a bottom plane of the device; Fig. 3 is a plan of the selecting member for different sizes of seeds; Fig. 4 is a view of the spring I prefer to employ between the hand lever and discharge gate.

As shown in Fig. 1, A indicates a suitable container, which may be a glass jar, and has a screw thread on the outer side of the mouth thereof, as is usual with Mason jars. My seed mechanism is adapted to be mounted on such jar in place of the ordinary cap.

What may be called the frame of my seed distributing mechanism comprises a cap made up of a disc 10, and a screw threaded flange 11, the extreme edge of which is preferably curled outwardly, as shown at 12. The cap is provided with a discharge opening 14, and above this opening I secure to this portion of the cap a suitable hopper 15, which thus lies within the jar, as shown in Fig. 1.

The frame of the device includes also an angle bracket 16, which has one leg lying against the cap flange and secured to it and another leg extending outwardly substantially in the plane of the disc of the cap. This angle bracket may be attached by welding it or soldering it to the flange portion of the cap, as indicated at 17, 18.

Beneath the disc 10 of the cap, and close to it, is a size-selecting disc 20 having a central opening 21 through which loosely extends a pivot 22, pivoting this member to the cap. This selecting member has formed in it a series of openings 23 of different sizes, these openings being arranged in a circular arc about the pivotal axis and preferably increasing in size from one end of the arc to the other. The distance from the axis of the disc 20 to the center of each opening is the same as the distance from the axis of the pivot pin to the center of the opening 14, so that any of the openings 23 may register with this opening 14.

The disc 20 is locked in selected position by means of a set screw 25 which is threaded at an upturned ear 24 on the disc 20 and bears against the flange of the cap. This flange is provided with a number of depressions 19 which are located the same angular distance apart as the centers of the openings 23 in the selecting disc. Accordingly, when the set screw 25 engages any depression, the corresponding opening 23 is in registration with the cap opening 14.

The movable discharge gate of my device comprises a disc 30 pivoted by the same rivet 22 which holds the selecting disc 20, this gate lying closely against the underface of the selecting disc. The gate member 30 has a single opening 31 which, in the normal or idle position of the gate at either end of its movement, may register with unselected openings 23 which are covered by the disc 10 or may lie between them. As the gate is snapped over dead center, however, the opening 31 momentarily registers with the selected opening 23 in the disc 20 which is located at the discharge 14 in the disc 10. During this momentary registration a small quantity of seed falls through the three aligned openings, the amount depending on the selected size of the openings and the speed of the gate.

The operating lever in my device is designated 40. It comprises a bar pivoted to the outwardly projecting arm of the angle bracket 16 by a suitable pivot member, as the screw 41. On the outer end of this bar may be mounted a handle 42 by which the bar may be given short oscillations. The oscillation is limited by a pin 43 on the bar extending into a notch 44 in the end of the angle bracket. On the inner side of its pivot the bar is diverted downwardly, as shown in 45 and then continues inwardly beneath the gate disc 30, as indicated at 46.

The inward extension 46 of the operating lever is connected with the gate disc 30 by a spring device indicated at 50. This spring device is shown as comprising a wire 52 embracing a pin 53 depending from the gate 30 and having hooked ends, and another hooked wire 54 anchored to a pin 55 rising from the lever extension 46. These two hooked members lie alongside of each other and are surrounded by a coiled spring 47, the construction being, as illustrated in Figs. 1 and 2, or in enlarged scale in Fig. 4.

It will be seen, from Fig. 2, that when the handle 42 there shown is moved into the position indicated in broken lines, the pin 55 to which the spring is anchored, is moved in a direction which carries it away from the pin 53 on the gate 30 and thus tensions the spring. This causes the gate to swing on its pivot. Such swinging of the gate is stopped by the engagement of an ear 34 thereon with the offset portion 45 of the lever. Then, when the lever is swung in the opposite direction, the spring swings the gate in the opposite direction thereof, until stopped by the ear 35 engaging the offset of the lever.

It will be observed by a comparison of the distance between the two stopping shoulders 34 and 35 on the gate in Fig. 2, and the distance which the lever moves, as indicated by its extreme positions in that figure, that the gate has a much greater movement than the lever. This is effected by means of the spring link 50. As soon as this link is tensioned by the lever and carried by it beyond the dead center, the gate snaps to its opposite extreme position.

The tensioning and positioning of the spring takes place before the gate opening has registered with that opening 23 which is in registration with the cap opening 14. Accordingly, as the lever moves back and forth the gate snaps across the registering discharge openings, first in one direction and then in the other, which movement I have found to be very effective in discharging the seeds one at a time and preventing their running out like a stream, even though seeds be small and the movement of the handle slow.

It results, from the construction described, that as the handle 42 is oscillated back and forth by the operator, the disc 30 is snapped back and forth on its pivot, thus bringing the discharge opening 31 momentarily into registration with the openings 23 and 14 above the gate and then out of registration therewith. By properly setting the selecting disc acording to the size of the seeds caried the seeds may be discharged rapidly but under control, as desired.

The spring arrangement described prevents shearing a seed if it happens to lie partly in an opening 23 and partly in the opening 31 of the gate at the time the gate is moving to closing position. In such case the spring yields and prevents injury to the seed.

In operating my device, a suitable quantity of seeds is placed in the jar, the cap screwed onto the jar, and the selecting disc set acording to the size of the seeds carried. Then to effect the discharge the jar is carried in the inverted form shown in Fig. 1, and the handle 42 manipulated back and forth by the operator's fingers as he walks along the ground to be seeded. This operation causes the seeds to be dropped one at a time through the gate opening 31.

If desired, the device may carry a discharge chute indicated in broken lines at 60 for directing the discharged seeds toward one side. Such chute may readily be a sheet metal trough or box and can be secured by the screw 41 and by engagement with the exterior surface of the cap thread.

I claim:

1. In a device of the character described, the combination of a cap adapted to be mounted on a container as a closure therefor and having an opening through it, a pivot pin carried by the cap, a gate mounted on the pivot pin having an opening adapted to register with the opening in the cap or extend to either side thereof, a lever pivotally mounted on the cap, and a spring link anchored at one end to the gate and anchored at the other end to the free end of the lever, such free end having a movement across a straight line passing through the pivotal axis and the anchorage of the spring to the gate.

2. The combination of a closure having an opening and adapted to be secured on a container, a gate pivotally mounted on the closure and having an opening adapted to register with the opening in the closure or bridge across such opening according to the position of the gate, a lever pivotally carried by the closure, a spring connecting the lever to the gate, and spaced shoulders on the gate adapted to engage the lever to limit the movement of the gate.

3. The combination of a screw threaded cap, a bracket secured thereto projecting to one side of the cap, the cap having an opening, a selecting disc having a series of openings arranged in an arc about a center, a gate having an opening, a pivot pin securing the selecting disc and gate to the cap, whereby any opening of the selecting disc may register with the opening through the cap and the opening of the gate may register with the selected disc opening, a lever pivoted to the bracket, and means connecting the lever with the gate.

4. The combination of a cap adapted to be secured to a container, a bracket carried by the cap, a gate pivotally mounted on the cap having an opening adapted to register with an opening in the cap or bridge across such opening according to the position of the gate, a lever pivoted on the bracket having a diverted portion and an extension thereof lying beneath the gate, said extension being connected to the gate, and shoulders on the gate adapted to engage opposite sides of the diverted portion of the lever to limit the movement of the gate.

5. The combination of a portable container having a discharge opening on the bottom, a pivot pin carried thereby, a gate mounted on said pivot pin having an opening adapted to register with said discharge opening or stand at either side thereof, a pivotally mounted lever, and a spring link anchored at one end to the gate and anchored at the other end to the lever, the point of anchorage to the lever having a movement across a straight line passing through the axis of the pivot pin and the anchorage of the spring to the gate.

6. In a device of the character described, the combination of a cap having a screw threaded flange and having a disc portion with an opening through it, an angle bracket secured to the flange, a lever pivotally mounted on the angle bracket, and a gate pivoted to the cap and operated by said lever and adapted to cover or uncover the discharge opening through the cap.

7. The combination of a screw threaded cap adapted to be secured removably to a container and having a discharge opening, a selecting disc on the underside of the closure and having an arcuate row of openings of various sizes, any of which register with the openings in the cap, said selecting disc having a flange extending across the flange of the cap and carrying means to coact with the cap flange to hold the selecting disc in selecting position, a gate below the selecting disc, a pivot pin mounted in the cap and carrying the selecting disc and gate, a projecting arm carried by the cap, and a lever pivoted to said arm and linked to the gate for oscillating the gate.

8. The combination of a cap having a screw threaded flange and a disc portion with a discharge opening through it, an angle bracket secured to the outer side of the screw threaded flange and projecting away from the disc portion, a selecting disc having an arcuate row of openings of various sizes, a gate having an opening through it, a pivot pin securing said gate and selecting disc to the cap, so that the opening in the gate may register with a selected opening of the disc and with the opening of the cap, a lever pivotally mounted on the projecting arm of the angle bracket and having an extension lying beneath the gate, and a spring anchored at one end to the lever extensions and at the other end to the gate.

9. The combination of a cap having a disc portion with a discharge opening through it, a selecting disc having an arcuate row of openings of various sizes, a gate having an opening through it, a pivot pin securing said gate and selecting disc to the cap so that the opening in the gate may register with a selected opening of the disc and with the opening of the cap, a hand lever pivotally carried by the cap and extending beneath the gate, a spring anchored at one end to the lever and at the other end to the gate, means to limit the oscillations of the lever, and means to limit the oscillation of the gate while allowing it a greater angular movement than the lever.

10. The combination of a container having a discharge opening, a movable gate having an opening through it adapted to coact with said discharge opening or be out of coaction therewith according to the position of the gate, a lever and a spring anchored at one end to the gate and at the other end to the lever adjacent its free end, the movement of the lever being such that it may swing the end of the spring carried thereby to one side or the other of the pivotal axis of the gate and spaced shoulders on the gate and coacting stops for limiting the extreme positions of the gate.

11. The combination of a flanged cap adapted to be removably mounted on a container having an open mouth and extend across the mouth thereof, there being a discharge opening through the cap, a selecting disc having an arcuate row of openings of various sizes, means carried by the selecting disc coacting with the cap for holding the disc in any selected position with an opening thereof in registration with said discharge opening, a gate having an opening through it, a pivot pin carried by the cap and pivoting both the selecting disc adjacent the cap and the gate adjacent the selecting disc, so that all of the openings mentioned may register selectively, a manual lever pivotally carried by the cap and extending beneath the gate, a spring anchored at one end to the gate and at the other end to the lever adjacent its free end, the movement of the lever being such that it may swing the end of the spring carried thereby to one side or the other of the pivotal axis of the gate, and spaced shoulders on the gate and cooperating stops limiting the extreme positions of the gate.

12. In a device of the character described, the combination of a cap adapted to be mounted on a container and having an opening through it, a pivot pin carried thereby, a selecting disc mounted on the pivot pin and having a series of openings of varying size, a gate mounted on the pivot pin having an opening, a lever pivotally mounted on the cap and a link connecting the lever to the gate.

13. In a device of the character described, the combination of a cap having a screw-thread flange whereby it may be mounted on a container having an open mouth surrounded by an external thread, a hopper secured to the cap and adapted to stand within the container, an opening through the cap registering with the hopper, a pivot pin mounted on the cap, a selecting disc mounted on the pivot pin and having a series of openings, a gate mounted on the pivot pin and having an opening, and a lever pivotally mounted on the cap and linked to the gate.

14. The combination of a container having a flat portion with a discharge opening eccentrically positioned, a pivot pin carried by said flat portion, a selecting disc mounted on the pivot pin and having an arcuate series of openings of respectively different sizes any one of which may register with the opening of the flat portion of the container, means for locking the disc in any one of a number of positions which one of its openings registering with the opening of the container and a gate pivotally mounted on the same pivot pin and having an opening adapted to register with the selected opening of said disc or be out of registration therewith and a hand lever mounted on the container and connected to the gate for oscillating the gate about its pivot.

JOSEPH V. LUDWIG.